United States Patent
Lindskog

(10) Patent No.: US 9,160,427 B1
(45) Date of Patent: *Oct. 13, 2015

(54) TRANSMIT DIVERSITY WITH FORMED BEAMS IN A WIRELESS COMMUNICATIONS SYSTEM USING A COMMON PILOT CHANNEL

(75) Inventor: Erik D. Lindskog, Sunnyvale, CA (US)

(73) Assignee: Intel Corporation, Santa Clara, CA (US)

( * ) Notice: Subject to any disclaimer, the term of this patent is extended or adjusted under 35 U.S.C. 154(b) by 2475 days.

This patent is subject to a terminal disclaimer.

(21) Appl. No.: 11/716,477

(22) Filed: Mar. 9, 2007

Related U.S. Application Data

(63) Continuation of application No. 10/186,986, filed on Jun. 28, 2002, now Pat. No. 7,206,554.

(51) Int. Cl.
*H04M 1/00* (2006.01)
*H04B 7/04* (2006.01)
*H04W 16/28* (2009.01)

(52) U.S. Cl.
CPC ............ *H04B 7/0408* (2013.01); *H04W 16/28* (2013.01)

(58) Field of Classification Search
USPC .............. 455/101, 114.2, 115.2, 269, 91, 95, 455/130, 134, 135, 136, 139, 141, 182.2, 455/193.1, 255, 276.1, 277.2, 296, 313, 455/334; 370/329, 342
See application file for complete search history.

(56) References Cited

U.S. PATENT DOCUMENTS

| | | | |
|---|---|---|---|
| 5,781,541 A * | 7/1998 | Schneider | 370/335 |
| 6,067,290 A | 5/2000 | Paulraj et al. | |
| 6,320,853 B1 * | 11/2001 | Wong et al. | 370/328 |
| 6,347,234 B1 | 2/2002 | Scherzer et el. | |
| 6,738,020 B1 | 5/2004 | Lindskog et al. | |
| 6,782,036 B1 | 8/2004 | Dowling et al. | |
| 6,847,832 B2 * | 1/2005 | Wong et al. | 455/562.1 |
| 6,865,377 B1 | 3/2005 | Lindskog et al. | |
| 6,999,794 B1 | 2/2006 | Lindskog et al. | |
| 2001/0031647 A1 | 10/2001 | Scherzer et al. | |
| 2001/0033622 A1 * | 10/2001 | Jongren et al. | 375/267 |
| 2003/0067993 A1 * | 4/2003 | Viswanathan | 375/267 |
| 2003/0162519 A1 * | 8/2003 | Smith et al. | 455/277.1 |
| 2004/0095907 A1 * | 5/2004 | Agee et al. | 370/334 |
| 2004/0266457 A1 | 12/2004 | Dupray | |

OTHER PUBLICATIONS

Pedersen et al., "A Simple Downlink Antenna Array Algorithm Based on a Hybrid Scheme of Transmit Diversity and Conventional Beamforming", 2001 IEEE, pp. 58-62.
Lindskog et al., "A Transmit Diversity Scheme for Channels with Intersymbol Interference", ICC 2000, Jun. 2000, vol. 1, pp. 307-311.

* cited by examiner

*Primary Examiner* — Zhiyu Lu
(74) *Attorney, Agent, or Firm* — Blakely, Sokoloff, Taylor & Zafman LLP

(57) ABSTRACT

A method and apparatus are provided that allows beamforming to be used on a user-specific signal together with a sector-wide pilot signal in a communication system, such as a CDMA system. In one embodiment, the invention includes transmitting a pilot signal with a wide beamwidth to a remote terminal from a first array, transmitting a first traffic signal with a narrow beamwidth directed to the remote terminal from the first array, and transmitting a second diversity traffic signal with a second narrow beamwidth directed to the remote terminal from a second array. In some examples, the invention may also include transmitting a second pilot signal from the second antenna array.

25 Claims, 4 Drawing Sheets

TRANSMIT DIVERSITY WITH FORMED BEAMS IN A WIRELESS COMMUNICATIONS SYSTEM USING A COMMON PILOT CHANNEL

CROSS-REFERENCE TO RELATED APPLICATIONS

The present application is continuation of prior application Ser. No. 10/186,986, filed Jun. 28, 2002 now U.S. Pat. No. 7,206,554, with the same title, the priority of which is hereby claimed.

BACKGROUND OF THE INVENTION

1. Field of the Invention

The present invention relates generally to the field of digital radio signal communications. More particularly, the invention relates to using transmit diversity with user-specific transmission parameters together with a common pilot signal.

2. Description of the Related Art

Many wireless data communication systems use training information or pilot signals that the receiving terminal uses to demodulate received traffic, control, overhead or other signals. One such example is the pilot signal transmitted by a base station in a CDMA (code division multiple access) communications system. Typically a single common pilot signal is transmitted to all remote or subscriber terminals in the base station's coverage area. The coverage area of the base station is typically referred to as a sector. Any signals transmitted to any particular user terminal can then be resolved with the help of the timing and phase information in the common pilot signal.

The pilot signal is particularly effective when the signal propagation path for both the pilot and the user-specific signal is the same. In a CDMA system in which the pilot and user-specific signal are sent over the same frequency band from the same antennas but with different scrambling codes, the pilot signal is very effective. However, any difference between signals makes the pilot signal more difficult to use or, in other words, it makes the user-specific signal more difficult to demodulate. If, for example, the user-specific signal is spatially directed toward the remote terminal and the pilot signal is a common sector-wide signal, then the two signals can traverse a different signal propagation path. This will cause the two signals, as received by the remote terminal, to differ.

The propagation channel of the pilot signal and the propagation channel of the traffic channel will differ whenever they are transmitted with beams of different width and shape. The user terminal typically uses the pilot signal to estimate a channel that then is used in the process of demodulating and detecting the symbols transmitted on the traffic channel. The difference in the propagation channel of the pilot signal and the traffic channel therefore reduces the accuracy of the channel estimate. To compensate, each user can be provided with a user-specific pilot signal but this greatly increases the amount of traffic on the network.

BRIEF SUMMARY OF THE INVENTION

A method and apparatus are provided that allows beamforming to be used on a user-specific signal together with a sector-wide pilot signal in a communication system, such as a CDMA system. In one embodiment, the invention includes transmitting a pilot signal with a wide beamwidth to a remote terminal from a first array, transmitting a first traffic signal with a narrow beamwidth directed to the remote terminal from the first array, and transmitting a second diversity traffic signal with a second narrow beamwidth directed to the remote terminal from a second array. In some examples, the invention may also include transmitting a second pilot signal from the second antenna array.

Other features of the present invention will be apparent from the accompanying drawings and from the detailed description that follows.

BRIEF DESCRIPTION OF THE SEVERAL VIEWS OF THE DRAWINGS

The present invention is illustrated by way of example, and not by way of limitation, in the figures of the accompanying drawings in which like reference numerals refer to similar elements and in which.

DETAILED DESCRIPTION OF THE INVENTION

Introduction

This invention allows beamforming to be used on a user-specific signal together with a sector-wide pilot signal in a communication system, such as a CDMA system. Only one pilot signal is required in the sector, although two can be used if the transmit diversity scheme requires. When beamforming is used on, for example, a traffic channel together with a sector-wide pilot, the difference in angular spread in the two propagation channels causes a mismatch in how the traffic channel and the pilot signal are received.

The difficulties caused by this mismatch can be alleviated by combining beamforming on the traffic channel with a sector wide pilot and a transmit diversity scheme. Adding transmit diversity adds a level of diversity into the channel mismatch. That is, the impairment due to the phase error (or other channel mismatch), is reduced by the fact that there are two different channels from the base station to the user terminal. The likelihood that both will have a large mismatch at the same time is less than the likelihood that any one of the channels will have a large mismatch. The robustness of the channel is significantly enhanced in a receiver that is designed to receive the particular type of diversity signals.

The present invention is described in the context of wireless base stations for air interfaces that allow beam forming, but it is not so limited. It is particularly applicable to wireless systems in which a pilot signal typically is shared among multiple users at the same time, as is commonly required in standards for CDMA (code division multiple access) systems. Current examples of such wireless systems are WCDMA (wideband CDMA), cdma2000, IS-95 (interim standard 95 of the Telecommunications Industry Association). The present invention may also be applied to some TDMA (time division multiple access) systems such as the downlink of HDR (high data rate for CDMA) and GSM (Global System for Mobile Communications).

Process Flow

Figure 1:
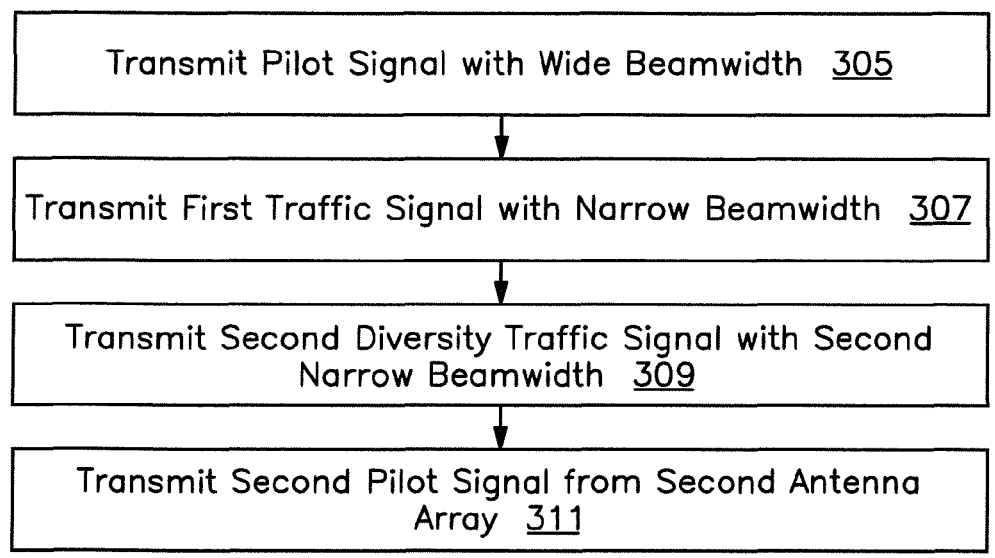
FIG. 1 is a flow chart showing one embodiment of the present invention.

FIG. 1 shows a process flow diagram for optimizing transmit parameters in accordance with the present invention. This process is described in the context of a base station (BS), in a network that includes many base stations, sending a pilot signal to any subscriber stations or remote user terminals that may be within range of the base station.

The base station may be equipped with any of a variety of different antenna configurations. For example, the base station may use two or more spatially separated antenna arrays 4-1, 4-2, 4-3 each with closely spaced antenna elements. The antenna elements can be spaced on the order of one half the wavelength of a typical signal carrier wave, while the arrays are spaced apart by at least a distance of several carrier wavelengths. Antenna arrays with similar spacing between elements can also be used with different polarization. In other words, two arrays of antennas differentiated either by their spatial location (e.g. 10-20 lambda or more apart) or by having different polarization (e.g. +45 and −45 degree polarization respectively) can be applied. Other types of antenna arrays may also be used.

The BS, or any radio operating in accordance with the present invention, transmits a pilot signal with a wide beamwidth 305 to any remote radios in range, for use as a phase reference to demodulate a traffic channel signal. The pilot channel can be transmitted across an entire sector of the base station or any subsector. The pilot signal can be transmitted on one or two sector-wide beams. The base station also transmits a first traffic signal with a narrow beamwidth 307 and transmits a second diversity traffic signal with a second narrow beamwidth 309.

The narrow beamwidths can be selected using signal processing resources 31, 33 of the base station specifically to provide diversity reception at a particular remote radio. Accordingly they are transmitted with different signal transmission parameters. The diversity signals, as mentioned above can be transmitted in accordance with any desired diversity scheme. According to some standards for transmit diversity, the base station will also transmit a second pilot signal from the second antenna array 311. These beams are typically all transmitted simultaneously, however, the particular timing of the transmissions will depend upon the particular diversity mode employed.

In one embodiment, the two user-specific narrow beamwidth signals are transmitted using a transmit diversity scheme like the closed loop transmit diversity scheme in WCDMA. In this case, two slightly different pilot signals are transmitted, one on a sector wide beam from the first array and one on a sector wide beam from the second array. Using these pilot signals the user terminal estimates the channel to each array and tells the base station how it should change the phase and possibly the amplitude of the traffic signals transmitted from each of the arrays so that the signals combine as coherently as possible. Since the traffic signal now arrives on two different beams with different channel mismatch, the user terminal benefits from this diversity in the channel mismatch, as mentioned above.

In another embodiment, the two user-specific narrow beamwidth signals are transmitted using an open loop transmit diversity scheme like, for example, either of the space-time block coding schemes in cdma2000 or WCDMA. In this embodiment, each part of the space-time block coding signal is transmitted over one of the beams. The user terminal then combines the signal in its receiver according to the space-time block coding algorithm, as detailed in the respective standards. In this embodiment, the user also receives the signal on two different beams with different channel mismatch. Again providing a performance improvement due to diversity.

Using conventional receivers and signal processors 68 and applying the approaches described above, the conventional receiver's tolerance to angular spread is significantly increased. This occurs with closed loop and open loop transmit diversity schemes that follow the standards for which the receiver is designed. In other words, the same BER (bit error rate) can be achieved with a significantly larger angular spread than without using the diversity transmission mode. This effect is not due to multipath, fading or other problems which diversity transmission is typically deployed to solve. The performance increase comes because the diversity transmission allows the receiver to overcome the phase mismatch between a directed traffic or other user-specific channel and a common pilot channel. As a result, the same channel quality can be obtained with all the benefits of directing narrow beams specifically to the intended user.

Optimizing Transmit Parameters

To further enhance reception by the remote terminal, the transmit parameters can be optimized. This can be done in a variety of different ways well-known in the art. An alternative useful and novel approach is described below with respect to FIG. 2. This process is described in the context of a base station (BS), in a network that includes many base stations, sending a BCH burst to any subscriber stations or remote user terminals that may be within range of the base station.

First a BS, or any radio operating in accordance with the present invention receives signals from a remote radio 105, for example the subscriber terminal shown in FIG. 6. Based on these received signals the BS can derive estimates of the channel on which the signals were received 107. From the estimate of the receive channel, a model of the expected transmit channel can be derived 109 and from that a model of the transmit weights 111 that can be used to transmit a user-specific signal back to the remote radio over the model of the transmit channel. Alternatively, any other set of parameters can be used instead of weights depending on the design of the system. Some systems may use signatures, vectors, or other types of parameters to control the transmission of a signal by a set of antenna elements.

The weights or other parameters are then optimized before use by a transmit power criterion 113. This can be done by developing a model of the expected transmit channel 115 and applying constraints on the estimated quality of the resulting transmitted signal 117. There are a variety of different constraints as described below. The optimization can be used to maximize the received power of the remote terminal as compared to the transmitted power. Having optimized the transmission parameters, they can be used to transmit a communications signal to the remote terminal 119. For example, the signal can be transmitted to the remote radio by applying a derived set of transmit weights to the elements of a transmit antenna array.

Outer Loop Target SINR Optimization

Figure 2:
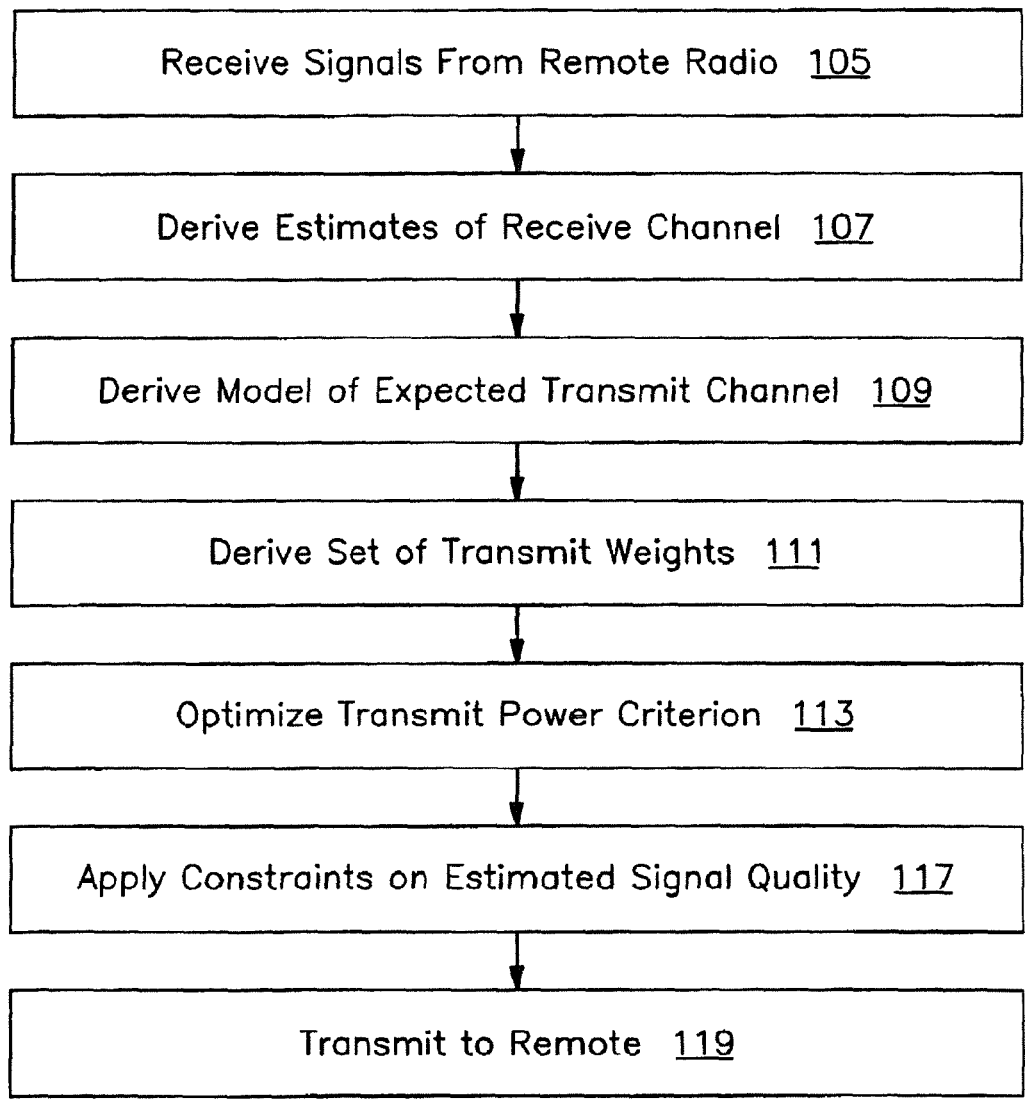
FIG. 2 is a flow chart showing a process for optimizing transmission parameters for use in one embodiment of the present invention.

Considering the example of FIG. 2, above in more detail, the transmission parameters can be optimized in one embodiment of the invention using an outer loop target SINR optimization. In this embodiment, the downlink transmission weights are selected based on estimates of the downlink performance of the selected weights. The estimates are formed using models of the downlink channel derived from the uplink signals. The model can be an estimate of a downlink spatial covariance matrix formed from a corresponding uplink spatial covariance matrix. The performance of the downlink weights can be estimated using the downlink channel model by estimating what outer loop SINR target would be required at the mobile in order to meet some specified outage requirement.

The outage requirement can be formulated in terms of how often the uncoded or coded BER or FER can be below some threshold. The outage requirement can also be formulated as how often the mismatch in phase between the traffic channel and the sector wide pilot can be above a certain level. The downlink weights giving the lowest estimated outer loop SINR target are then selected by solving an optimization problem, minimizing the outer loop SINR target.

The outer loop SINR target optimization approach can be applied to the example of FIG. 2 in many different ways. In one embodiment of the invention, a base station receives signals on an uplink channel from a remote terminal and estimates receive spatial signatures. The receive spatial signature can either be used to estimate transmit spatial signatures or to estimate transmit spatial covariance matrix. Transmit spatial signatures and transmit spatial covariance matrices can be estimated in a variety of different ways well-known in the art. The transmit signatures or matrices can be a set of transmit signatures or matrices derived on a tap-by-tap basis.

The transmit values can then be optimized using a model of the transmit or downlink channel. A suitable model can be formed as $h=R^{H/2}v$, where v is a column vector with M complex Gaussian random elements, M being the number of transmit antennas, $R^{H/2}$ being the Hermitian of the Cholesky factorization of the estimated transmit covariance matrix and h being a realization of a transmit spatial signature. Different realizations of the transmit spatial signature can be generated by generating new random vectors v. If sets of signatures or matrices are used, this model can be applied to generate separate estimates of the transmit spatial signatures for different taps in a transmit spatio-temporal channel model.

Using this, or another model, transmit weights can be found that result in the lowest outer loop SINR target such that an outage requirement is met. Several different outage requirements can be used or outage requirements can be combined. One example is that the BER must be less than x percent at least y percent of the time. Another example is that the FER must be less than x percent at least y percent of the time. A third example is that the phase error of the user-specific signal compared to the phase of a pilot signal transmitted using a different weight must be less than x degrees at least y percent of the time. The selection of x and y will depend upon the particular configuration and requirements of a specific implementation.

Applying the outage requirement allows transmit weights to be found using well-known algorithms for non-linear constrained optimization. Alternatively, the solution of the problem can be simplified by selecting from a predetermined family of weights. Each set of weights or weight vector in the family would be determined to produce a beam that gives a maximum gain, computed as a weighted average over some angular region, while meeting a constraint on the maximum deviation in the phase of the beam from the beam used by the sector wide pilot over the same (or different) angular region.

Stated another way, each weight vector in the family of weight vectors is parameterized by one or more real numbers. For example, each weight generates a beam of a different beamwidth. Each weight vector generates a beam that has a constraint on the phase error of the generated beam as compared to the phase error of the beam of, for example a common pilot signal. The phase error constraint can also be a constraint on the maximum phase error as compared to the beam of the pilot signal for an range of angles of arrival. Each weight vector also maximizes a function of the gain over a range of angles of arrival. The particular parameters and constraints to be used in generating the predetermined family of weight vectors will depend on the particular application.

Power Optimization Under a Phase Error Constraint

As an alternative to the outer loop target SINR optimization, in another embodiment, the parameters can be optimized by selecting the downlink transmission weights as the weights that optimize the delivered power given a constraint on the phase error, and on the total transmitted power.

The delivered power can be estimated using any of the downlink channel estimates described above. The constraint on the phase error can be a constraint on the RMS (root mean square) phase error, the x:th percentile of the phase error, where x is selected for a particular implementation, or some other some other convenient form. Alternatively, instead of a phase error constraint, a constraint on the difference between the phasors of the pilot channel complex gain or channel and the traffic channel complex gain or channel, or some other convenient function of the two channels can be used.

The power optimization approach can be applied to the example of FIG. 2 in many different ways. In one embodiment, a base station derives transmit spatial signatures or transmit spatial covariance matrices as described above and a similar model of the downlink channel is derived.

The optimization problem in the present embodiment is to find a transmit weight vector that results in the maximum average delivered power, given a fixed transmit power, such that an outage requirement is met. The outage requirement can take many different forms. One such form is that the phase error of the user specific signal as compared to the phase of a pilot signal transmitted using a different weight must be less than x degrees at least y percent of the time. The transmit weight vector can be found by using constrained optimization algorithms.

As with the example above, the solution of the optimization problem can be simplified using a predetermined set of weight vectors from which to select. The set of transmit weights can be parameterized by one or more real numbers in the same manner as described above.

Base Station Structure

In one embodiment as discussed above, the present invention is implemented in an SDMA (Spatial Division Multiple Access) radio data communications system. In such a spatial division system, each terminal is associated with a set of spatial parameters that relate to the radio communications channel between, for example, the base station and a user terminal. The spatial parameters comprise a spatial signature for each terminal. Using the spatial signature and arrayed antennas, the RF energy from the base station can be more precisely directed at a single user terminal, reducing interference with and lowering the noise threshold for other user terminals. Conversely, data received from several different user terminals at the same time can be resolved at lower receive energy levels. With spatial division antennas at the user terminals, the RF energy required for communications can be even less. The benefits are even greater for subscribers that are spatially separated from one another. The spatial signatures can include such things as the spatial location of the transmitters, the directions-of-arrival (DOAs), times-of-arrival (TOAs) and the distance from the base station.

Estimates of parameters such as signal power levels, DOAs, and TOAs can be determined using known training sequences placed in digital data streams for the purpose of channel equalization in conjunction with sensor (antenna) array information. This information is then used to calculate appropriate weights for spatial demultiplexers, multiplexers, and combiners. Techniques well known in the art, can be used to exploit the properties of the training sequences in determining spatial parameters. Further details regarding the use of spatial division and SDMA systems are described, for example, in U.S. Pat. No. 5,828,658, issued Oct. 27, 1998 to Ottersten et al. and U.S. Pat. No. 5,642,353, issued Jun. 24, 1997 to Roy, Ill. et al.

(SDMA) technology can be combined with other multiple access systems, such as time division multiple access (TDMA), frequency division multiple access (FDMA) and code division multiple access (CDMA). Multiple access can be combined with frequency division duplexing (FDD) or time division duplexing (TDD).

FIG. 2 shows an example of a base station of a wireless communications system or network suitable for implementing the present invention. The base station uses SDMA technology which can be combined with other multiple access systems, such as time division multiple access (TDMA), frequency division multiple access (FDMA) and code division multiple access (CDMA). Multiple access can be combined with frequency division duplexing (FDD) or time division duplexing (TDD). The system or network includes a number of subscriber stations, also referred to as remote terminals or user terminals, such as that shown in FIG. 3. The base station may be connected to a wide area network (WAN) through its host DSP 31 for providing any required data services and connections external to the immediate wireless system.

To support spatial diversity, a plurality of antennas 3 is used to form an antenna array 4, for example four antennas, although other numbers of antennas may be selected. Each antenna is an element of a four-element array 4. And a plurality of arrays are provided 4-1, 4-2, 4-3. The antenna elements may have a spacing of from one-quarter to four wavelengths of a typical carrier frequency while the arrays may be separated by ten or twenty wavelengths. The best spacing for spatial diversity will depend upon the particular frequencies involved, the physical installation and other aspects of the system. In many applications, the spacing between antenna elements of each array can be less than two wavelengths of the received signal. The spacing between antenna arrays can be more than two wavelengths of the received signal. In general, the spacing between elements in an array is selected to minimize grating lobes when transmissions from each element are coherently combined. In an alternative approach, the arrays are spaced apart so as to form a uniform array of elements. The distance between nearest elements in different arrays is the same as the spacing between elements within an array. As mentioned above, it is also possible for each array to have only a single element.

A set of spatial multiplexing weights for each subscriber station are applied to the respective modulated signals to produce spatially multiplexed signals to be transmitted by the bank of four antennas. The host DSP 31 produces and maintains spatial signatures for each subscriber station for each conventional channel and calculates spatial multiplexing and demultiplexing weights using received signal measurements. In this manner, the signals from the current active subscriber stations, some of which may be active on the same conventional channel, are separated and interference and noise suppressed. When communicating from the base station to the subscriber stations, an optimized multi-lobe antenna radiation pattern tailored to the current active subscriber station connections and interference situation is created. The channels used may be partitioned in any manner. In one embodiment the channels used may be partitioned as defined in the GSM (Global System for Mobile Communications) air interface, or any other time division air interface protocol, such as Digital Cellular, PCS (Personal Communication System), PHS (Personal Handyphone System) or WLL (Wireless Local Loop). Alternatively, continuous analog or CDMA channels can be used.

The outputs of the antennas are connected to a duplexer switch 7, which in a TDD embodiment, may be a time switch. Two possible implementations of the duplexer switch are as a frequency duplexer in a frequency division duplex (FDD) system, and as a time switch in a time division duplex (TDD) system. When receiving, the antenna outputs are connected via the duplexer switch to a receiver 5, and are converted down in analog by RF receiver ("RX") modules 5 from the carrier frequency to an FM intermediate frequency ("IF"). This signal then is digitized (sampled) by analog to digital converters ("ADCs") 9. Final down-converting to baseband is carried out digitally. Digital filters can be used to implement the down-converting and the digital filtering, the latter using finite impulse response (FIR) filtering techniques. This is shown as block 13. The invention can be adapted to suit a wide variety of RF and IF carrier frequencies and bands.

There are, in the example of GSM, eight down-converted outputs from each antenna's digital filter 13, one per receive timeslot. The particular number of timeslots can be varied to suit network needs. While GSM uses eight uplink and eight downlink timeslots for each TDMA frame, desirable results can also be achieved with any number of TDMA timeslots for the uplink and downlink in each frame. For each of the eight receive timeslots, the four down-converted outputs from the four antennas are fed to a digital signal processor (DSP) 31 an ASIC (Application Specific Integrated Circuit) or FPGA (Field Programmable Gate Array) (hereinafter "timeslot processor") for further processing, including calibration, according to one aspect of this invention. For TDMA signals, eight Motorola DSP56300 Family DSPs can be used as timeslot processors, one per receive timeslot. The timeslot processors 17 monitor the received signal power and estimate the frequency offset and time alignment. They also determine smart antenna weights for each antenna element. These are used in the SDMA scheme to determine a signal from a particular remote user and to demodulate the determined signal. In a WCDMA system, the channels may be separated using codes in an FPGA and then further processed separately perhaps using separate DSPs for different users. Instead of being timeslot processors the processors are channel processors.

The output of the timeslot processors 17 is demodulated burst data for each of the eight receive timeslots. This data is sent to the host DSP processor 31 whose main function is to control all elements of the system and interface with the higher level processing, which is the processing which deals with what signals are required for communications in all the different control and service communication channels defined in the system's communication protocol. The host DSP 31 can be a Motorola DSP56300 Family DSP. In addition, timeslot processors send the determined receive weights for each user terminal to the host DSP 31. The host DSP 31 maintains state and timing information, receives uplink burst data from the timeslot processors 17, and programs the timeslot processors 17. In addition it decrypts, descrambles, checks error correcting code, and deconstructs bursts of the uplink signals, then formats the uplink signals to be sent for higher level processing in other parts of the base station.

Furthermore DSP 31 may include a memory element to store data, instructions, or hopping functions or sequences. Alternatively, the base station may have a separate memory element or have access to an auxiliary memory element. With respect to the other parts of the base station it formats service data and traffic data for further higher processing in the base station, receives downlink messages and traffic data from the other parts of the base station, processes the downlink bursts and formats and sends the downlink bursts to a transmit controller/modulator, shown as 37. The host DSP also manages programming of other components of the base station including the transmit controller/modulator 37 and the RF timing controller shown as 33. The RF controller 33 reads and transmits power monitoring and control values, controls the duplexer 7 and receives timing parameters and other settings for each burst from the host DSP 31.

The transmit controller/modulator 37, receives transmit data from the host DSP 31. The transmit controller uses this data to produce analog IF outputs which are sent to the RF transmitter (TX) modules 39. Specifically, the received data bits are converted into a complex modulated signal, up-converted to an IF frequency, sampled, multiplied by transmit weights obtained from host DSP 31, and converted via digital to analog converters ("DACs") which are part of transmit controller/modulator 37 to analog transmit waveforms. The analog waveforms are sent to the transmit modules 39. The transmit modules 39 up-convert the signals to the transmission frequency and amplify the signals. The amplified transmission signal outputs are sent to antennas 3 via the duplexer/time switch 7. In a CDMA system, the signals may also be spread and scrambled using appropriate codes.

User Terminal Structure

Figure 3:
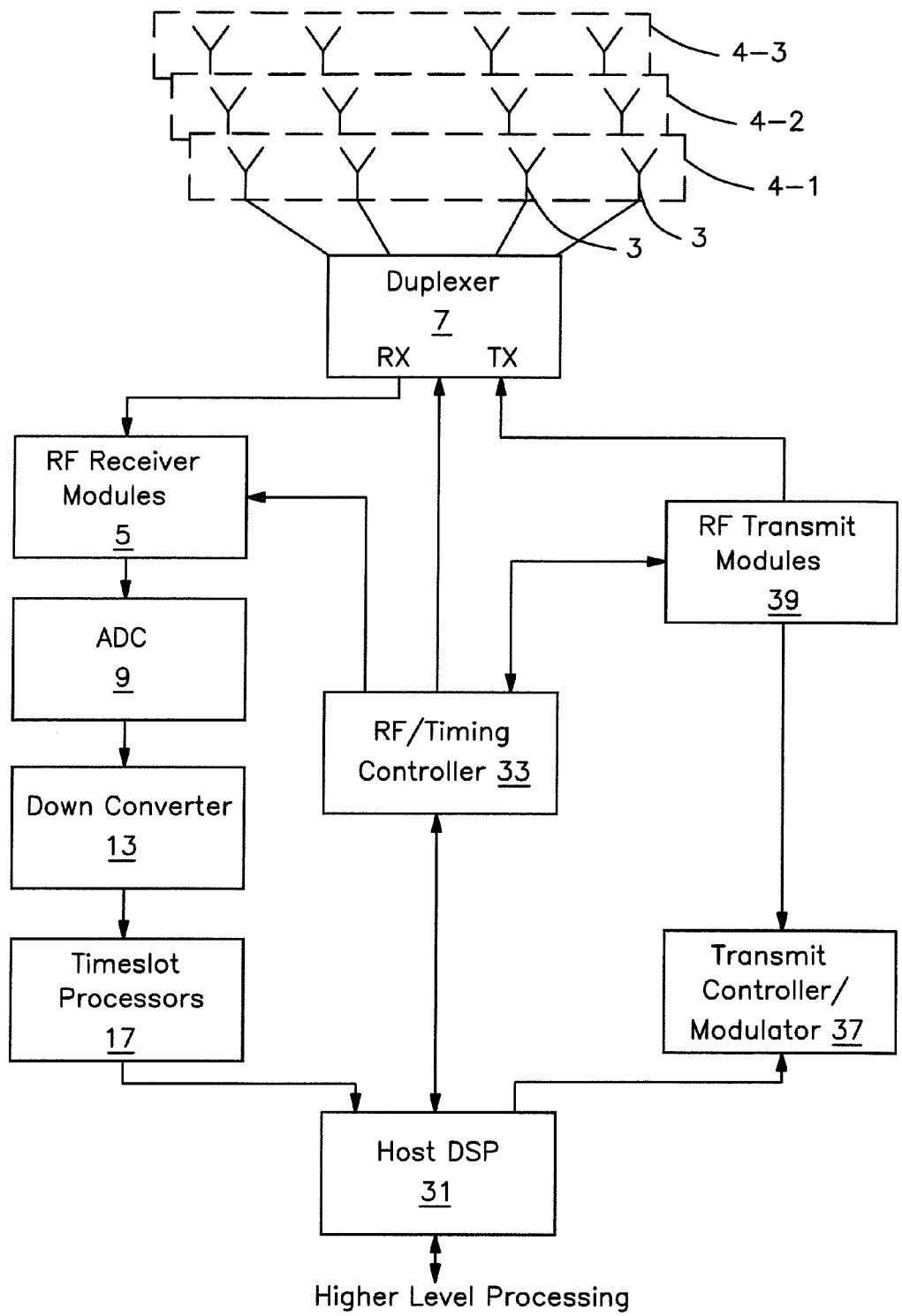
FIG. 3 is a simplified block diagram of a base station on which an embodiment of the invention can be implemented.
Figure 4:
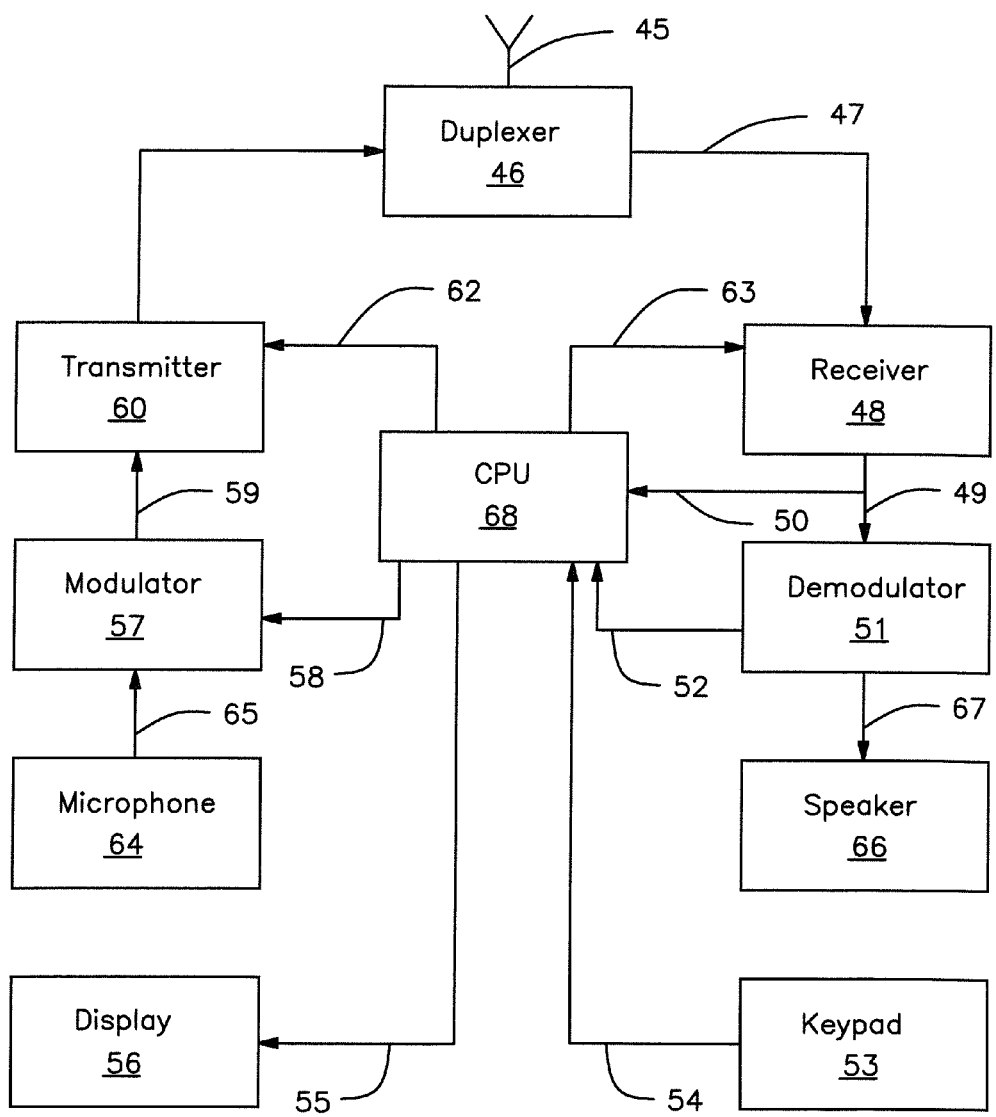
FIG. 4 is a block diagram of a remote terminal on which an embodiment of the invention can be implemented.

FIG. 3 depicts an example component arrangement in a remote terminal that provides data or voice communication. The remote terminal's antenna 45 is connected to a duplexer 46 to permit the antenna 45 to be used for both transmission and reception. The antenna can be omni-directional or directional. For optimal performance, the antenna can be made up of multiple elements and employ spatial processing as discussed above for the base station. In an alternate embodiment, separate receive and transmit antennas are used eliminating the need for the duplexer 46. In another alternate embodiment, where time division duplexing is used, a transmit/receive (TR) switch can be used instead of a duplexer as is well known in the art. The duplexer output 47 serves as input to a receiver 48. The receiver 48 produces a down-converted signal 49, which is the input to a demodulator 51. A demodulated received sound or voice signal 67 is input to a speaker 66.

The remote terminal has a corresponding transmit chain in which data or voice to be transmitted is modulated in a modulator 57. The modulated signal to be transmitted 59, output by the modulator 57, is up-converted and amplified by a transmitter 60, producing a transmitter output signal 61. The transmitter output 61 is then input to the duplexer 46 for transmission by the antenna 45.

The demodulated received data 52 is supplied to a remote terminal central processing unit 68 (CPU) as is received data before demodulation 50. The remote terminal CPU 68 can be implemented with a standard DSP (digital signal processor) device such as a Motorola series 56300 Family DSP. This DSP can also perform the functions of the demodulator 51 and the modulator 57. The remote terminal CPU 68 controls the receiver through line 63, the transmitter through line 62, the demodulator through line 52 and the modulator through line 58. It also communicates with a keyboard 53 through line 54 and a display 56 through line 55. A microphone 64 and speaker 66 are connected through the modulator 57 and the demodulator 51 through lines 65 and 67, respectively for a voice communications remote terminal. In another embodiment, the microphone and speaker are also in direct communication with the CPU to provide voice or data communications. Furthermore remote terminal CPU 68 may also include a memory element to store data, instructions, and hopping functions or sequences. Alternatively, the remote terminal may have a separate memory element or have access to an auxiliary memory element.

In one embodiment, the speaker 66, and the microphone 64 are replaced or augmented by digital interfaces well-known in the art that allow data to be transmitted to and from an external data processing device (for example, a computer). In one embodiment, the remote terminal's CPU is coupled to a standard digital interface such as a PCMCIA interface to an external computer and the display, keyboard, microphone and speaker are a part of the external computer. The remote terminal's CPU 68 communicates with these components through the digital interface and the external computer's controller. For data only communications, the microphone and speaker can be deleted. For voice only communications, the keyboard and display can be deleted.

General Matters

In the description above, for the purposes of explanation, numerous specific details are set forth in order to provide a thorough understanding of the present invention. It will be apparent, however, to one skilled in the art that the present invention may be practiced without some of these specific details. In other instances, well-known circuits, structures, devices, and techniques have been shown in block diagram form or without detail in order not to obscure the understanding of this description.

The present invention includes various steps. The steps of the present invention may be performed by hardware components, such as those shown in FIGS. 2 and 3, or may be embodied in machine-executable instructions, which may be used to cause a general-purpose or special-purpose processor or logic circuits programmed with the instructions to perform the steps. Alternatively, the steps may be performed by a combination of hardware and software. The steps have been described as being performed by either the base station or the user terminal. However, many of the steps described as being performed by the base station may be performed by the user terminal and vice versa. Furthermore, the invention is equally applicable to systems in which terminals communicate with each other without either one being designated as a base station, a user terminal, a remote terminal or a subscriber station. Thus, the present invention is equally applicable and useful in a peer-to-peer wireless network of communications devices using spatial processing. These devices may be cellular phones, PDAs, laptop computers, or any other wireless devices. Generally, since both the base stations and the terminals use radio waves, these communications devices of wireless communications networks may be generally referred to as radios.

In portions of the description above, only the base station is described as performing spatial processing using adaptive antenna arrays. However, the user terminals can also contain antenna arrays, and can also perform spatial processing both on receiving and transmitting (uplink and downlink) within the scope of the present invention.

Furthermore, in portions of the description above, certain functions performed by a base station could be coordinated across the network, to be performed cooperatively with a number of base stations. For example, each base station antenna array could be a part of a different base station. The base station's could share processing and transceiving functions. Alternatively, a central base station controller could perform many of the functions described above and use the antenna arrays of one or more base stations to transmit and receive signals.

The present invention may be provided as a computer program product, which may include a machine-readable medium having stored thereon instructions, which may be used to program a computer (or other electronic devices) to perform a process according to the present invention. The machine-readable medium may include, but is not limited to, floppy diskettes, optical disks, CD-ROMs, and magneto-optical disks, ROMs, RAMs, EPROMs, EEPROMs, magnet or optical cards, flash memory, or other type of media/machine-readable medium suitable for storing electronic instructions. Moreover, the present invention may also be downloaded as a computer program product, wherein the program may be transferred from a remote computer to a requesting computer by way of data signals embodied in a carrier wave or other propagation medium via a communication link (e.g., a modem or network connection).

Many of the methods are described in their most basic form, but steps can be added to or deleted from any of the methods and information can be added or subtracted from any of the described messages without departing from the basic scope of the present invention. It will be apparent to those skilled in the art that many further modifications and adaptations can be made. The particular embodiments are not provided to limit the invention but to illustrate it. The scope of the present invention is not to be determined by the specific examples provided above but only by the claims below.

It should also be appreciated that reference throughout this specification to "one embodiment" or "an embodiment" means that a particular feature may be included in the practice of the invention. Similarly, it should be appreciated that in the foregoing description of exemplary embodiments of the invention, various features of the invention are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the Detailed Description are hereby expressly incorporated into this Detailed Description, with each claim standing on its own as a separate embodiment of this invention.

What is claimed is:

1. A method comprising:
   receiving, at a subscriber station, a pilot signal with a first set of spatial parameters as a wide beamwidth broadcast channel for use as a phase reference by a plurality of different subscriber stations;
   transmitting, from the subscriber station, a first user-specific traffic signal (hereafter first traffic signal) with a second set of spatial parameters different from the first set of spatial parameters as a narrow beamwidth traffic channel directed to another station; and
   transmitting, from the subscriber station, a second user-specific diversity traffic signal (hereafter second traffic signal) with a third set of spatial parameters different from the second set of spatial parameters as a second narrow beamwidth traffic channel directed to the same other station, the second traffic signal carrying the same traffic as the first traffic signal.

2. The method of claim 1, wherein transmitting the first traffic signal comprises transmitting the first traffic signal from a first antenna array of the subscriber station, and wherein transmitting the second diversity traffic signal comprises transmitting the second diversity traffic signal from a second antenna array of the subscriber station.

3. The method of claim 2, further comprising receiving a second pilot signal with the third set of spatial parameters.

4. The method of claim 2, wherein the first and second antenna arrays of the subscriber station are spatially separated.

5. The method of claim 2, wherein the first and second antenna arrays of the subscriber station are differently polarized.

6. The method of claim 1, wherein transmitting the first and second traffic signals comprises transmitting the first and second traffic signals each with a different polarization.

7. The method of claim 1, wherein transmitting the first and second traffic signals comprises transmitting the first and second traffic signals with spatial diversity.

8. The method of claim 1, wherein transmitting the first and second traffic signals comprises transmitting in accordance with a closed loop transmit diversity scheme.

9. The method of claim 3, further comprising transmitting an indication from the subscriber station of the relative phase of the received first and second pilot signals for adjusting the relative phase of subsequent first and second traffic signals in accordance therewith.

10. The method of claim 1, wherein transmitting the first and second traffic signals comprises transmitting in accordance with a space time block coding transmit diversity scheme.

11. The method of claim 1, further comprising deriving transmission weights for the traffic signals by selecting transmission weights that minimize the transmitted downlink power under a quality constraint of the delivered downlink traffic signal.

12. The method of claim 1, wherein the subscriber station is located within a transmission sector, and wherein transmitting the pilot signal comprises transmitting the pilot signal with a sector-wide beam.

13. The method of claim 1, wherein the first and second traffic signals are the same.

14. The method of claim 1, wherein the pilot signal is a common pilot signal.

15. The method of claim 1, wherein transmitting the first and second traffic signals comprises transmitting the first and second traffic signals with narrower beam widths than the pilot signal.

16. A machine-readable non-transitory medium having stored thereon data representing instructions which, when executed by a machine, cause the machine to perform operations comprising:
   receiving, at a subscriber station, a pilot signal with a first set of spatial parameters as a wide beamwidth broadcast channel for use as a phase reference by a plurality of different subscriber stations;
   transmitting, from the subscriber station, a first user-specific traffic signal (hereafter first traffic signal) with a second set of spatial parameters different from the first set of spatial parameters as a narrow beamwidth traffic channel directed to another station; and
   transmitting, from the subscriber station, a second user-specific diversity traffic signal (hereafter second traffic signal) with a third set of spatial parameters different from the second set of spatial parameters as a second narrow beamwidth traffic channel directed to the same other station, the second traffic signal carrying the same traffic as the first traffic signal.

17. The medium of claim 16, wherein the instructions for transmitting the first traffic signal comprise instructions which, when executed by the machine, cause the machine to perform further operations comprising transmitting the first traffic signal from a first antenna array, and wherein the instructions for transmitting the second diversity traffic signal comprise instructions which, when executed by the machine, cause the machine to perform further operations comprising transmitting the second diversity traffic signal from a second antenna array.

18. The medium of claim 17, further comprising instructions which, when executed by the machine, cause the machine to perform further operations comprising receiving a second pilot signal at the subscriber station.

19. The medium of claim 16, further comprising instructions which, when executed by the machine, cause the machine to perform further operations comprising deriving transmission weights for the traffic signals by selecting transmission weights that minimize the transmitted uplink power under a quality constraint of the delivered uplink traffic signal.

20. A subscriber station comprising:
   a receive demodulator to receive and demodulate a pilot signal with a first set of spatial parameters as a wide beamwidth broadcast channel for use as a phase reference by a plurality of different subscriber stations;
   a transmit modulator to transmit and modulate a data signal to form a first traffic signal to carry traffic to another terminal as a narrow beamwidth traffic channel directed to another station,
   to apply a second different set of spatial parameters to the data signal for a second traffic signal directed to the other terminal as a second narrow beamwidth traffic channel directed to the same other station, the second traffic signal carrying the same traffic as the first traffic signal, and
   to apply a third set of spatial parameters different from the second set of spatial parameters to the data signal for a third user-specific diversity traffic signal directed to the other terminal as a third narrow beamwidth traffic channel directed to the same other station.

21. The apparatus of claim 20, further comprising a first and a second antenna array, the first antenna array to transmit the second traffic signal and the second antenna array to transmit the third diversity traffic signal and wherein the first and second antenna arrays are spatially separated.

22. The apparatus of claim 21, wherein the first and second antenna arrays are differently polarized.

23. The apparatus of claim 20, wherein the signal processor adjusts the relative phase of the second and second traffic signals in accordance with the relative phase of a received first and second pilot signals.

24. The apparatus of claim 20, wherein the signal processor derives transmission weights for application to the transmit arrays by selecting transmission weights that minimize the transmitted power.

25. The apparatus of claim 20, wherein the pilot signal is a common pilot signal.

* * * * *